United States Patent
Pai

(10) Patent No.: US 6,223,739 B1
(45) Date of Patent: May 1, 2001

(54) BARBECUE GRILL

(76) Inventor: Lucas Pai, No. 124, Ying-Hua Rd., Hsitun Dist., Taichung (TW)

( * ) Notice: Subject to any disclaimer, the term of this patent is extended or adjusted under 35 U.S.C. 154(b) by 0 days.

(21) Appl. No.: 09/542,137

(22) Filed: Apr. 4, 2000

(51) Int. Cl.$^7$ .................................................. A47J 37/00
(52) U.S. Cl. ............................ 126/41 R; 126/38; 126/40; 126/50
(58) Field of Search ........................ 126/29.39 J, 30.38, 126/41 R, 25 R, 9 R, 4, 40, 92 AC, 25 A, 273 R, 50; 99/448, 449, 450

(56) References Cited

U.S. PATENT DOCUMENTS

| | | | |
|---|---|---|---|
| 2,631,216 | * 3/1953 | Ames | 126/41 R |
| 3,103,160 | * 9/1963 | Forniti | 126/41 R |
| 3,332,339 | * 7/1967 | Helgeson et al. | 126/41 R |
| 3,547,097 | * 12/1970 | Rice | 126/4 |
| 4,055,677 | * 10/1977 | White | 126/41 R |
| 5,094,221 | * 3/1992 | Ho | 126/41 R |

* cited by examiner

Primary Examiner—James C. Yeung
(74) Attorney, Agent, or Firm—Graybeal Jackson Haley LLP

(57) ABSTRACT

A barbecue grill with multiple functions has a base, a body securely mounted on the top face of the base, at least one barbecue holder detachably held in the body, a main frame mounted on the top edge of the body and a heater pivotally mounted in the main frame. A thermo-conductive pan is detachably mounted on the main frame and abuts the heater. By such an arrangement, the barbecue grill can cook on the pan or roast foods in the body by the heater when the heater is rotated relative to the main frame upward or downward. Consequently, the functional use of the barbecue grill will be improved.

20 Claims, 4 Drawing Sheets

BARBECUE GRILL

BACKGROUND OF THE INVENTION

1. Field of the Invention

The present invention relates to a barbecue grill, and more particularly to a barbecue grill with multiple ways of cooking foods.

2. Description of Related Art

A conventional barbecue grill is always used for cooking meats, vegetables, seafood, etc. by a heat source such as charcoal. The conventional barbecue grill substantially comprises a bowl for receiving the burning charcoal, and a grate located above the bowl to cook foods placed on the grate. However, the conventional barbecue grill is only used for barbecuing. The functional use of the conventional barbecue grill is limited.

To overcome the shortcomings, the present invention tends to provide an improved barbecue grill to mitigate or obviate the aforementioned problems.

SUMMARY OF THE INVENTION

The main objective of the invention is to provide an improved barbecue grill having a base, a body securely mounted on a top face of the base, at least one barbecue holder detachably held in the body, a hollow main frame mounted on a top edge of the body and a heater pivotally mounted in the main frame. Such that, the barbecue grill can cook or roast foods by the heater when the heater is rotated relative to the main frame upward or downward respectively. This can increase the functional uses of the barbecue grill.

Other objects, advantages and novel features of the invention will become more apparent from the following detailed description when taken in conjunction with the accompanying drawings.

DETAILED DESCRIPTION OF PREFERRED EMBODIMENT

Figure 1:
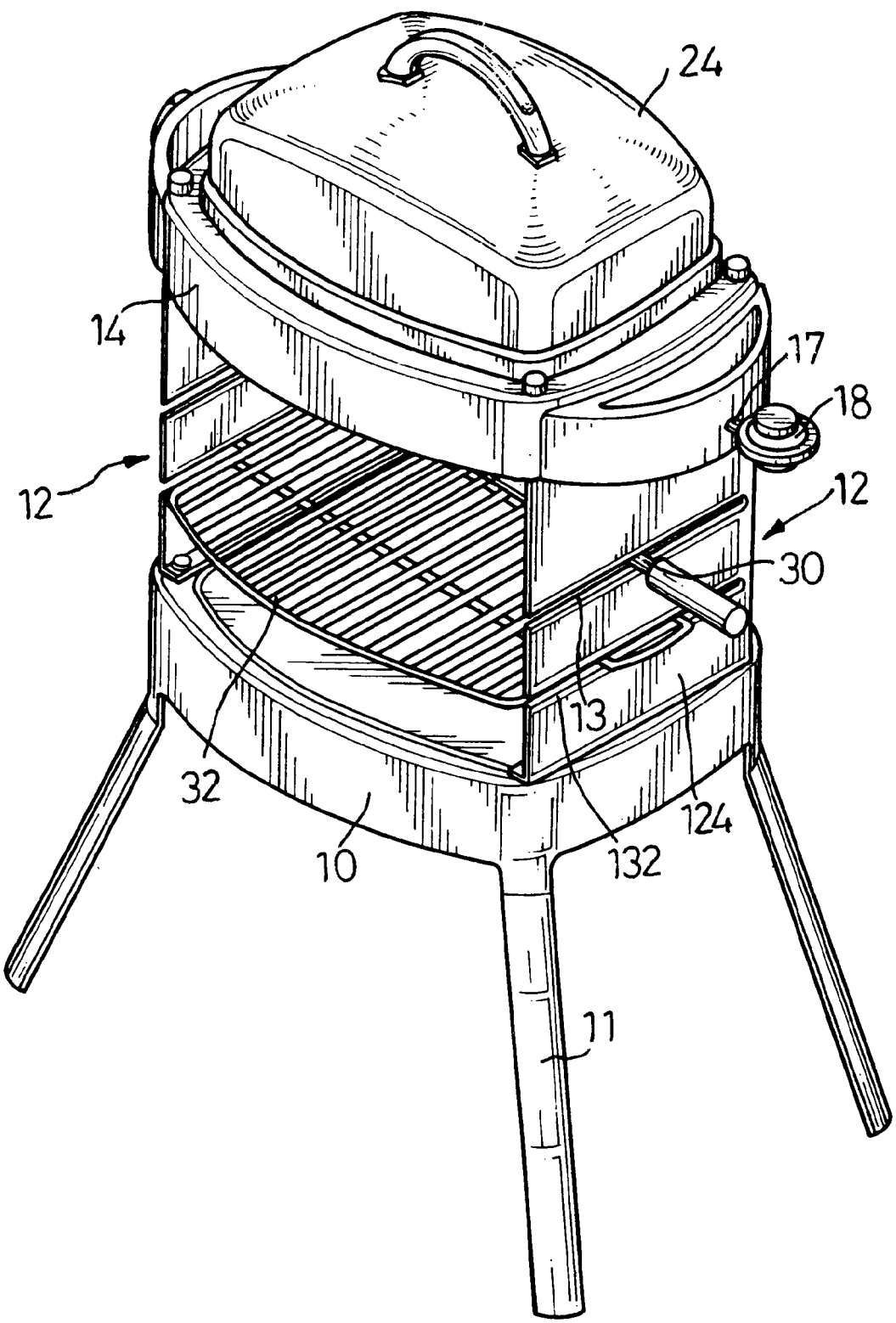
FIG. 1 is a perspective view of a barbecue grill in accordance with the present invention.
Figure 2:
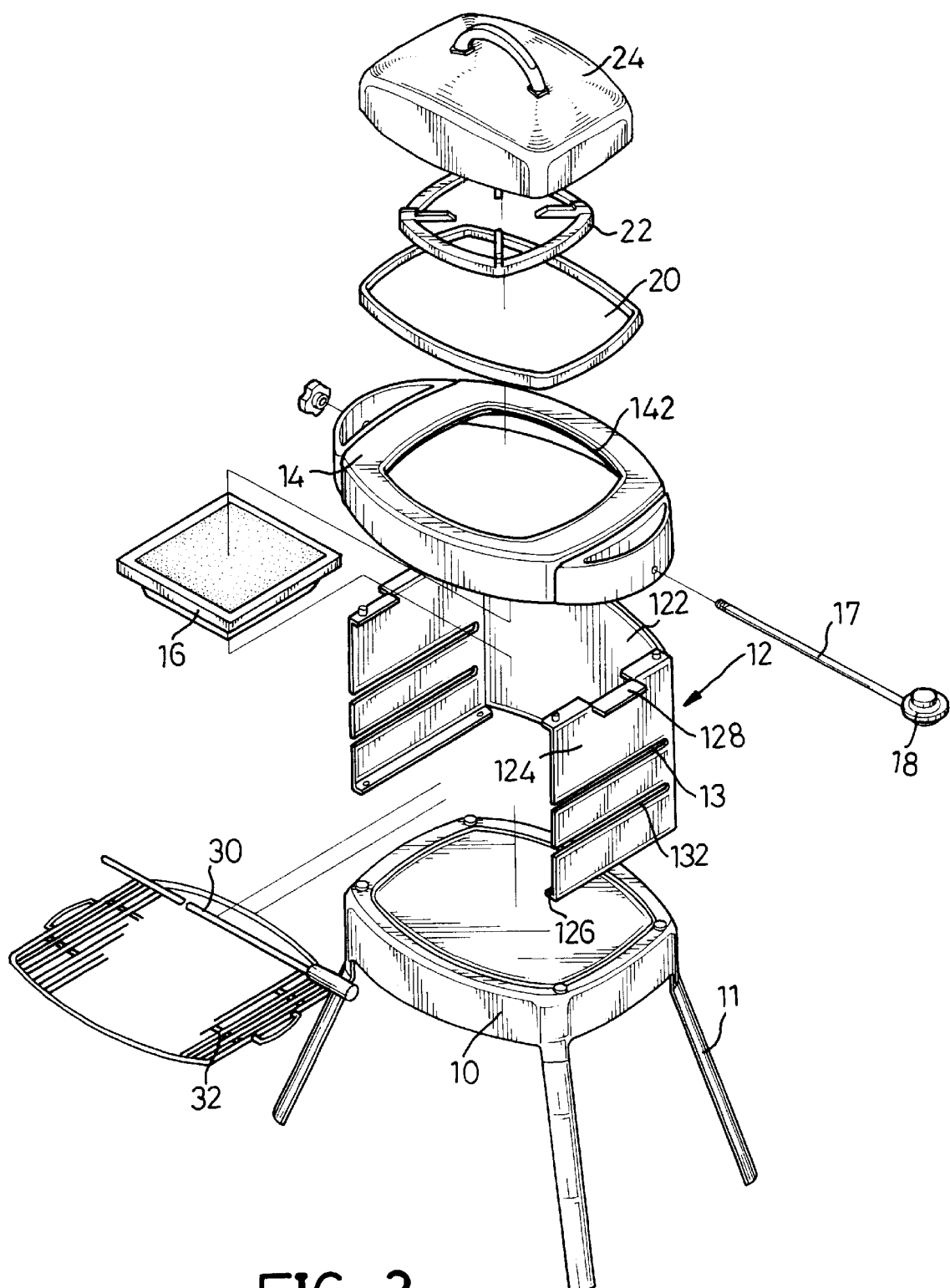
FIG. 2 is an exploded perspective view of the barbecue grill in FIG. 1.

Referring to FIGS. 1 and 2, a barbecue grill in accordance with the present invention comprises a base (10), a body (12) mounted on top of the base (10), a main frame (14) mounted on the top edge of the body (12) and a heater (16) pivotally mounted on the main frame (14). The base (10) has four legs (11) mounted on the bottom face to support the base (10). The body (12) includes a back sheet (122) and two sides (124) laterally extending from opposite ends of the back sheet (122) respectively. At least one slit (13, 132) is defined in each side (124) of the body (12) and corresponds to a slit (13,132) on the other side (124), such that a barbecue holder such as a skewer (30) or a grate (32) can be held between the corresponding slits (13,132) on the two sides (124). In addition, at least one flange (126,128) extends perpendicular from the bottom and top edges of each body side (124), such that the body (12) can be attached to the base (10) by bolts extending through the bottom flanges (126) of the body (12), and the main frame (14) can be attached to the body (12) by bolts extending through the top flanges (128) of the body (12).

The main frame (14) is a hollow body to receive the heater therein. A central hole (142) is defined in the top of the main frame (14) to accommodate the heater (16). A thermo-conductive pan (20) is detachable placed on the top face of the main frame (14) and abuts the heater (16), such that the heat generated by the heater (16) is conducted to the pan (20). The heater (16) could be a gas burner. A gas pipe (17) extends into one end of the main frame (14) and connects with the heater (16) to provide fuel to the heater (16). The gas pipe (17) is pivotally connected to the other end of the main frame (14) so as to serve as a pivot pin between the main frame (14) and the heater (16). A control valve (18) is mounted on the gas pipe (17) to control the gas flow.

Figure 3:
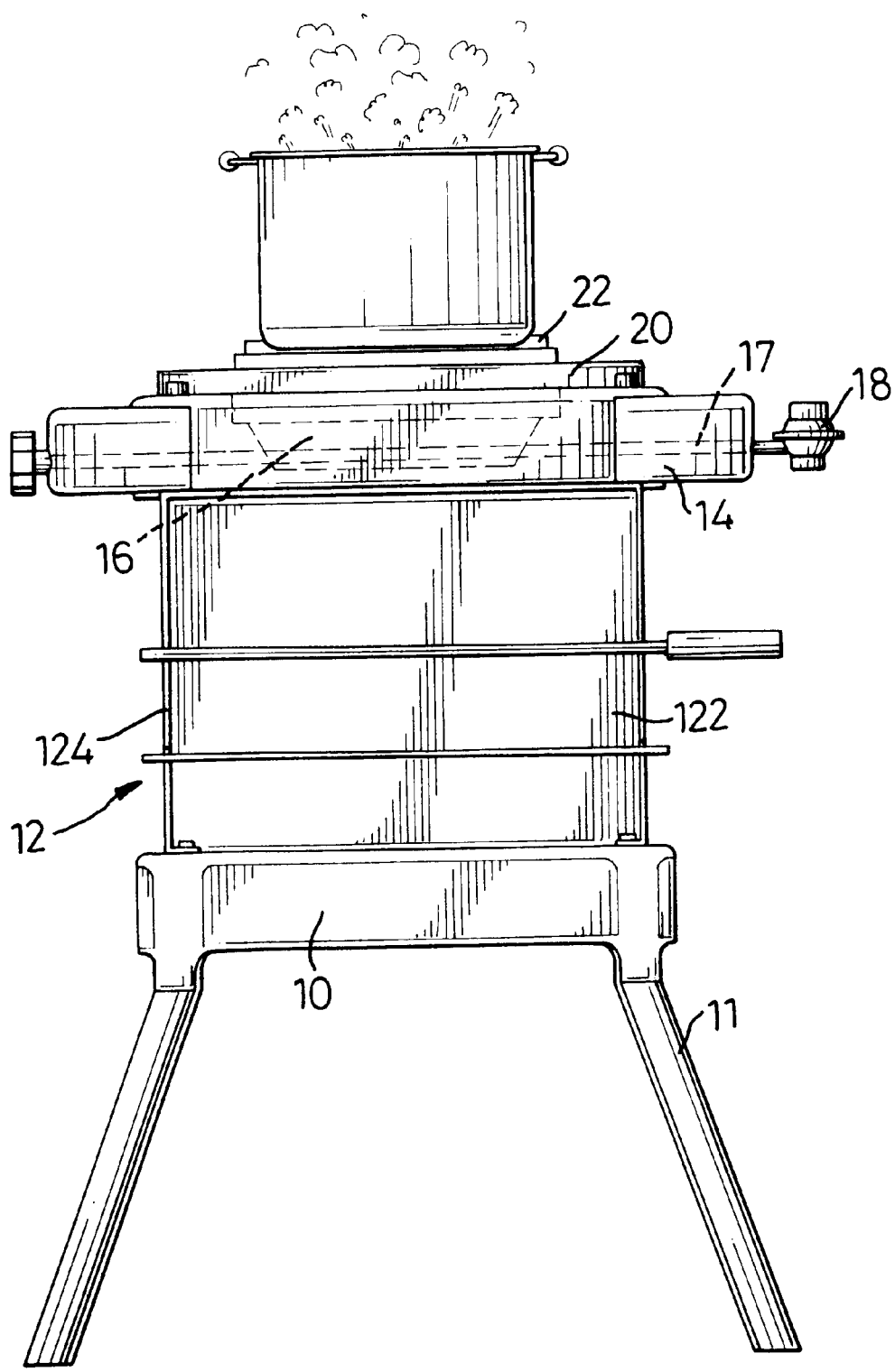
FIG. 3 is a front plan view of the barbecue grill in FIG. 1 showing the grill being used for cooking food.

In operation, referring to FIGS. 2 and 3, when the heater (16) is rotated upward relative to the main frame (14) and abuts the thermo-conductive pan (20), the heat generated by the heater (16) will be conducted to the pan (20), such that the user can cook foods in a metal pot or directly above the heated pan (20). In addition, a grate (22) is disposed on the thermo-conductive pan (20) to support a pot when the user cooks foods with a pot or the like. A lid (24) is placed above the pan (20) to cover it as the user cooks directly foods on the heated pan (20).

Figure 4:
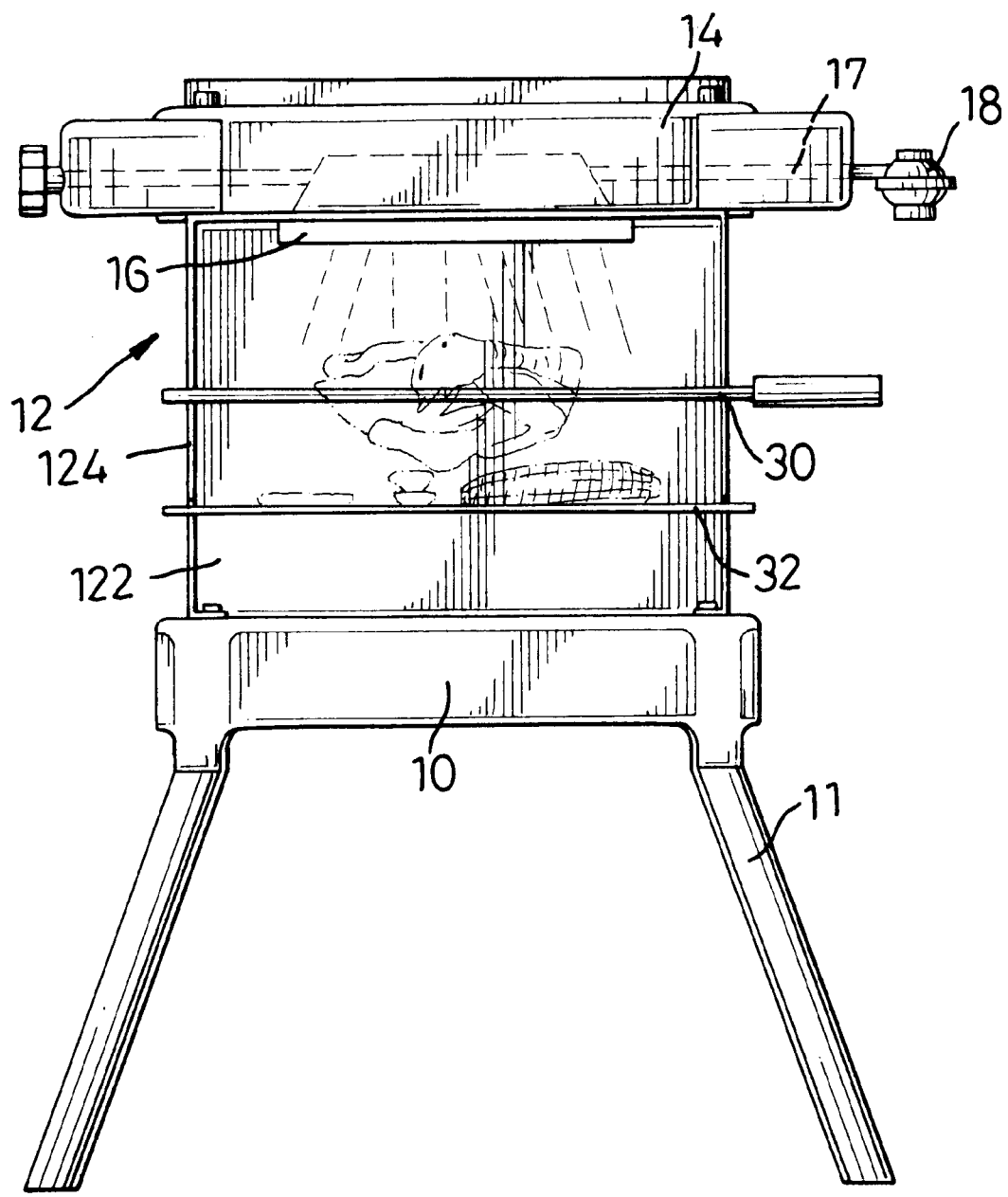
FIG. 4 is a front plan view of the barbecue grill in FIG. 1 showing the grill being used for boiling food.

In another operational embodiment, referring to FIG. 4, when the pan (20) is removed and the heater (16) is rotated downward relative to the main frame (14), the heat generated by the heater (16) will be conducted into the body (12). In such a configuration, the user can place a chicken or a turkey on the skewer (30) or put meats or vegetables on the grate (32) to roast foods in the body (12) with the heater (16) as the heat source. Consequently, the barbecue grill can cook food by means of boiling, frying or roasting. The barbecue grill can cook foods in different ways depending on the needs or desires of the user.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A barbecue grill comprising:
   a base;
   a body securely mounted on top of said base wherein said body has a back sheet and two sides laterally extending from opposite ends of said back sheet respectively;
   at least one flange extending perpendicular from a bottom edge of each body side for mounting with said base;
   at least one barbecue holder detachably held in said body;
   a main frame mounted on a top edge of said body; and
   a heater pivotally mounted in said main frame
   wherein at least one slit is defined in each said side of said body and corresponds to one slit on the other side for holding said barbecue holder between said corresponding slits on two sides.

2. The barbecue grill as claimed in claim 1 further comprising a thermo-conductive pan detachably mounted on said main frame and abutting said heater.

3. The barbecue grill as claimed in claim 2 further comprising a grate detachably deposited on said pan.

4. The barbecue grill as claimed in claim 1 further comprising a lid mounted on said main frame to cover said frame.

5. The barbecue grill as claimed in claim 1, wherein said barbecue holder is a skewer.

6. The barbecue grill as claimed in claim 1, wherein said barbecue holder is a grate.

7. The barbecue grill as claimed in claim 1, wherein at least one flange extends perpendicular from a top edge of each body side for mounting with said main frame.

8. The barbecue grill as claimed in claim 1, wherein said heater is a gas burner;

a gas pipe extends into said main frame and connects with said heater; and a control valve is mounted on said gas pipe to control the gas flow.

9. The barbecue grill as claimed in claim 1, wherein multiple legs are fixed on a bottom face of said base.

10. The barbecue grill as claimed in claim 1, wherein said main frame is a hollow body; and a central hole is defined in a top face of said main frame for said heater.

11. A barbecue grill comprising:

a base;

a body securely mounted on top of said base wherein said body has a back sheet and two sides laterally extending from opposite ends of said back sheet respectively;

at least one flange extending perpendicular from a top edge of each body side for mounting with said main frame;

at least one barbecue holder detachably held in said body;

a main frame mounted on a top edge of said body; and a heater pivotally mounted in said main frame wherein at least one slit is defined in each said side of said body and corresponds to one slit on the other side for holding said barbecue holder between said corresponding slits on two sides.

12. The barbecue grill as claimed in claim 11, further comprising a thermo-conductive pan detachably mounted on said main frame and abutting said heater.

13. The barbecue grill as claimed in claim 12, further comprising a grate detachably deposited on said pan.

14. The barbecue grill as claimed in claim 11, further comprising a lid mounted on said main frame to cover said frame.

15. The barbecue grill as claimed in claim 11, wherein said barbecue holder is a skewer.

16. The barbecue grill as claimed in claim 11, wherein said barbecue holder is a grate.

17. The barbecue grill as claimed in claim 11, wherein at least one flange extends perpendicularly from a bottom edge of each body side for mounting with said base.

18. The barbecue grill as claimed in claim 11, wherein said heater is a gas burner;

a gas pipe extends into said main frame and connects with said heater; and a control valve is mounted on said gas pipe to control the gas flow.

19. The barbecue grill as claimed in claim 11, wherein multiple legs are fixed on a bottom face of said base.

20. The barbecue grill as claimed in claim 11, wherein said main frame is a hollow body; and a central hole is defined in a top face of said main frame for said heater.

* * * * *